Nov. 17, 1959    J. F. MASLOW ET AL    2,913,001
CHECK VALVE
Filed Dec. 27, 1956
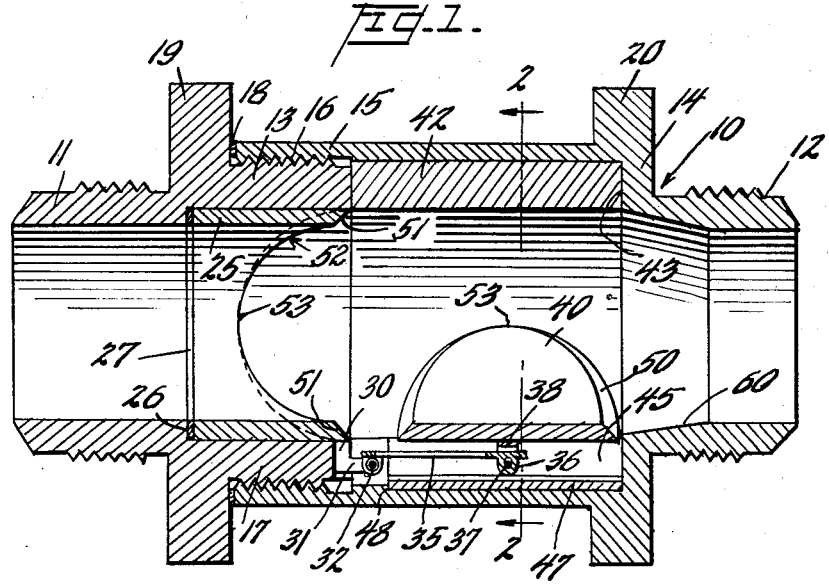
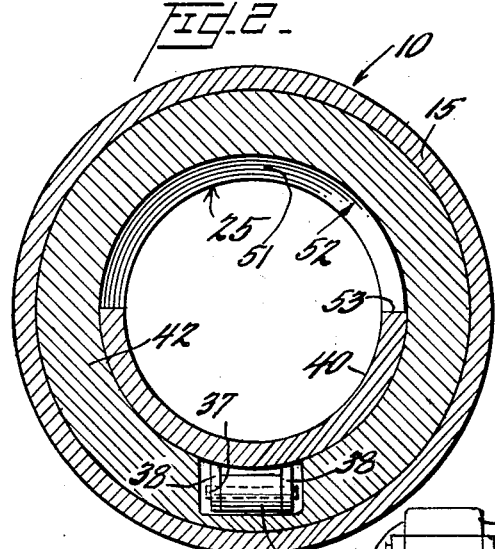
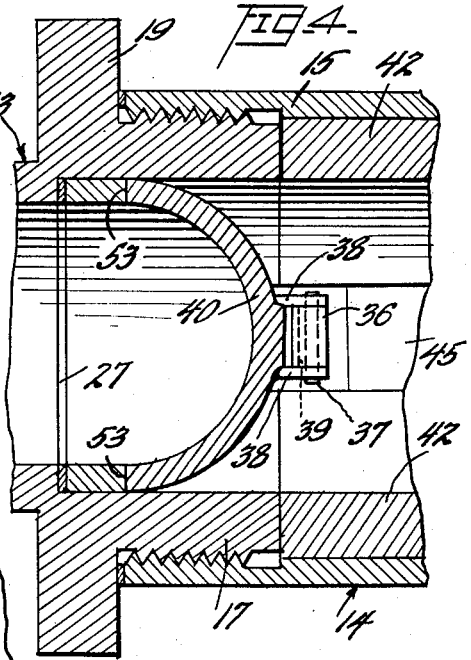
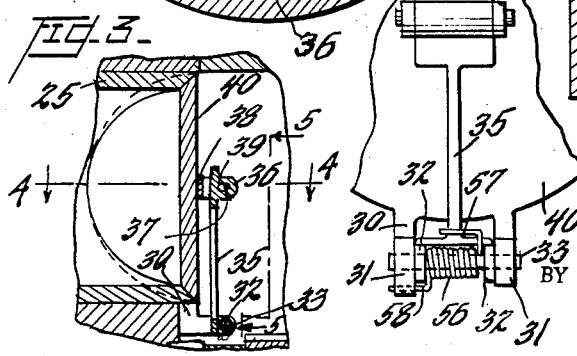
INVENTORS
John F. Maslow &
Richard J. Zeitler
BY Watson, Cole, Grindle & Watson
ATTORNEYS

United States Patent Office 2,913,001
Patented Nov. 17, 1959

2,913,001

CHECK VALVE

John F. Maslow, Annapolis, Md., and Richard J. Zeitler, Danbury, Conn., assignors to Flight Refueling Incorporated, Baltimore, Md., a corporation of Delaware Application December 27, 1956, Serial No. 630,860

1 Claim. (Cl. 137—527.4)

This invention relates to valves and more particularly to check valves adapted to be disposed in pipes or conduits through which fluid material is transmitted for the purpose of preventing backflow of such material but yielding to flow in the forward direction.

The general object of the invention is the provision of a novel and improved check valve of the class described which embodies features which render it more effective in use and easy to manufacture, assemble, and install.

In its preferred embodiment, the invention contemplates the provision of a pivoted swinging check valve having means for urging it into a closed position transversely of the conduit in which it is installed, and having a substantially cylindrical curvature approximating that of the internal wall of the conduit wherein it is used, whereby when in open position it is brought into close juxtaposition with the wall of the conduit so as to offer a minimum of obstruction to the flow of fluid. As an additional feature eliminating unnecessary obstructions, the pivotal support for the valve is received in a recess outside of the internal diameter of the conduit.

Provision is also made for a novel seat for the valve in closed position, whereby certain portions of the wall of the conduit are shouldered throughout their circular extent with a sinuous curvature accommodated to the cylindrical configuration of the valve.

The valve installation according to the present invention insures a minimum of pressure drop in the line since in open position the internal cross section of the conduit is maintained with substantially no obstructions.

Other objects and features of novelty will be apparent from the following description when read in connection with the accompanying drawings in which one embodiment of the invention is illustrated by way of example.

In the drawings,

Figure 1 is a view in vertical longitudinal section of a conduit coupling in which is installed a check valve embodying the principles of the invention;

Figure 2 is a transverse sectional view taken on line 2—2 of Figure 1;

Figure 3 is a fragmentary view similar to Figure 1 but showing the valve in closed position;

Figure 4 is a horizontal central sectional view taken on line 4—4 of Figure 3; and Figure 5 is a fragmentary view in elevation of the resilient pivotal supporting means for the valve taken substantially from line 5—5 of Figure 3, looking in the direction of the arrows.

In the illustrated embodiment of the invention the novel check valve is incorporated in a coupling assembly indicated generally by the reference numeral 10 and this assembly is provided at each end with a threaded nipple 12 for attachment to the conduit proper. Other means of installation of the valve in a pipe or conduit may of course be employed without departure from the principles of the invention.

The two principal portions of the coupling 10 are designated 13 and 14, the part 13 being a male member and the part 14 having an enveloping flange 15 threaded as at 16 upon the horizontal flange 17 of the part 13. A packing ring or washer 18 may be provided between the end of the flange 15 which abuts the radial flange 19 of the member 13. A flange 20 is preferably provided on the member 14 corresponding to the radial flange 19 and both of these flanges may be of polygonal periphery for the application of a wrench for disconnecting the parts of the coupling.

Seated in an enlarged portion of the coupling member 13 is a valve seat element 25, this element having an internal diameter equal to the internal diameter of the nipple 11 of the member 13 and abutting a shoulder 26 between the two internal diameters of the member 13, a gasket or packing ring 27 being interposed at this point.

Projecting downwardly and forwardly from the outward lip of the seating element 25 are two spaced ears 31 between which are disposed the lugs or ears 32 of the valve supporting arm 35, a pintle 33 passing through registering openings in all of these ears.

The outer end of the lever arm 35 is provided with a lug 36 having an opening therein to accommodate the pintle pin 37 which passes through the spaced lugs 38 extending from the rear central portion of the valve element 40. Preferably the opening 39 through the lug 36 is slightly elongated to allow some degree of play between the valve 40 and the valve supporting arm 35.

The valve member 40 is of a peculiar construction both as to its general warped configuration and with respect to its peripheral seating edge. The valve member, as clearly indicated in Figures 2 and 4 of the drawings, is of a partly cylindrical configuration so that in its open position (shown in Figures 1 and 2) it is snugly nested against the internal diameter of a cylindrical insert member 42 fitted within the female element 14 of the coupling 10 between the end of the flange 17 of the male element 13 and a shoulder 43 just inwardly of the female member 14.

The substantially cylindrical insert 42 is grooved along its bottom median line as at 45, this groove or slot forming a recess for the reception of the major portion of the lever 35 and the pivotal connections 36—39. The thinner wall portion 47 at the bottom of the groove 45 terminates as at 48 to provide a further recess to accommodate the bracket ears 31 and the pivoting lugs 32 of the lever 35, adjacent the bottom forward portion of the seat element 25.

For the purpose of effecting a perfect seal between the valve 40 and the seating member 25, the mutually engaging edge surfaces are provided with an unusual configuration where the upper and lower portions 51 of the peripheral edge 50 of the valve 40 and the peripheral seat 52 of the member 25, are chamfered at approximately a 45° angle while the meeting portions laterally of the installation as illustrated, make a 90° angle with the axis of the coupling, as at the points 53. This is most clearly shown in Figures 2 and 4 of the drawings. The entire seating edge 50 of the valve 10 and the seat 52 of the element 25 merge gently from the angled portions 51 at the top and bottom of the seat to the rectilinear position 53 at the transverse diameter.

For urging the valve toward closed position so as to be opened only against pressure flow from left to right as viewed in Figure 1, a spring device is provided between the valve arm 35 and the bracket 30. This arrangement is best shown in Figure 5 of the drawings where the spring 56 is coiled around the hinge pin 33 upon which the lever pivots, one end 57 of the spring 56 being bent at an angle and hooked around the lever 35 while the other end 58 of the spring 56 is bent at an angle to bear against the under side of one of the ears 31 which depend from the seating member 25. Thus the predetermined tendency of the coil spring 56 to unwind will urge the lever 35 toward valve closing position with whatever force is desired.

From the above description it will be clearly understood how the novel check valve effectively seals the opening against flow when in seated position, and when opened to its fullest extent rests within a slightly enlarged portion of the bore of the coupling and affords no obstruction to the flow of fluid; and in fact the parts are so devised as to even provide a minimum of abrupt projecting surfaces which might give rise to frictional retardation or produce eddy currents. It will be noted that the difference in diameters of the insert 42 and the main portions of the conduit exemplified by the nipples 11 and 12 is substantially the same as the thickness of the valve 40 and the seating member 25. A tapered section 60 between the internal diameter of the nipple 12 and that of the insert 42 streamlines the flow at that point; the beveled nature of the edge 50 of the valve 40 is also conducive of easier flow of fluid past the opened valve; and similarly the same taper at 52 on the seat member 25 offers the same gradual change in contour.

It will be understood that various changes and modifications may be made in the embodiment of the invention illustrated and described without departing from the scope of the invention as defined in the following claim.

Having thus described the invention, what is claimed as new and desired to be secured by Letters Patent is:

Fluid flow controlling means comprising, in combination, a tubular conduit of symmetrical arcuate cross-section having one diameter of a given dimension and a second rectilinear diameter of a given dimension, a valve member in said conduit for controlling flow therethrough, said valve member comprising a plate warped to a generally arcuate curvature conforming substantially to the curvature of the internal wall of said conduit upon one side of said second named diameter thereof, and the valve member being of substantially the same arcuate extent as that half of said internal wall, the length of said valve member being substantially equal to said first named diameter and the projected peripheral contour of said valve member in plan in opened position being the same as the cross-section of said conduit at the location of said valve member, means for pivotally mounting said valve member at a point on said internal wall of the conduit at one end of said first named diameter for swinging movement about said point as a center which is adjacent the end of the median element of the cylindrical curvature of said valve member, whereby when said valve member is in open position it lies snugly against the said half portion of the conduit wall, and in closed position seals off the cross-section of the conduit adjacent the location of the valve member, a peripherally undulating shoulder formed around the internal wall of the conduit, the periphery of the valve member conforming to and adapted to abut axially against said shoulder and seal off the flow when in closed position, said valve member being pivoted so as to lie in an arcuate recess within said conduit when it is in open position, said shoulder and said recess both being substantially of the same depth as the thickness of the valve member, a tubular insert disposed in a recess in said conduit and the end of said insert providing said shoulder, said tubular insert being of an internal diameter substantially equal to that of the major portion of the conduit, a second substantially tubular insert disposed in said conduit surrounding the orbit of movement of said valve member and being of greater internal diameter than that of the major portion of the conduit and of said first named insert, and against which said valve member lies when in open position, said valve member being supported on a lever which extends along its convex surface which nests against the second named insert, and a slot formed in said second named insert and extending longitudinally thereof to accommodate said lever when the parts are in conduit-open position.

References Cited in the file of this patent

UNITED STATES PATENTS

| | | |
|---|---|---|
| 444,451 | Messinger | Jan. 13, 1891 |
| 474,843 | Mahan | May 17, 1892 |
| 542,417 | Lenhart | July 9, 1895 |
| 1,000,719 | Cram | Aug. 15, 1911 |
| 1,786,152 | Dornacher | Dec. 23, 1930 |
| 2,447,842 | Cameron et al. | Aug. 24, 1948 |
| 2,482,198 | Melichar | Sept. 20, 1949 |